US012068706B2

(12) United States Patent
Sano

(10) Patent No.: US 12,068,706 B2
(45) Date of Patent: Aug. 20, 2024

(54) CONTROL DEVICE FOR ELECTRIC DRIVE SYSTEM

(71) Applicant: DENSO CORPORATION, Kariya (JP)

(72) Inventor: Tomohisa Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 191 days.

(21) Appl. No.: 17/883,865

(22) Filed: Aug. 9, 2022

(65) Prior Publication Data

US 2022/0385224 A1 Dec. 1, 2022

Related U.S. Application Data

(63) Continuation of application No. PCT/JP2021/002050, filed on Jan. 21, 2021.

(30) Foreign Application Priority Data

Feb. 14, 2020 (JP) ................. 2020-023227

(51) Int. Cl.
H02P 27/08 (2006.01)
H02K 9/10 (2006.01)
(Continued)

(52) U.S. Cl.
CPC ............. H02P 27/08 (2013.01); H02K 9/10 (2013.01); H02K 11/25 (2016.01); H02K 11/33 (2016.01); H02P 6/08 (2013.01)

(58) Field of Classification Search
CPC ...... H02P 2101/30; H02P 29/60; H02P 29/64; H02P 29/66; H02P 29/68; H02P 29/0241; H02P 29/032; H02P 25/022; H02P 25/03; H02P 25/00; H02P 25/062; H02P 25/064; H02P 25/08; H02P 23/28; H02P 27/00; H02P 27/06; H02P 27/08; H02P 27/085; H02P 9/00; H02P 9/302; H02P 1/42; H02P 1/423; B60L 2200/26; B60L 2220/16;
(Continued)

(56) References Cited

U.S. PATENT DOCUMENTS

2014/0330489 A1 11/2014 Sakamoto et al.
2019/0280634 A1 9/2019 Ota et al.

FOREIGN PATENT DOCUMENTS

CN 107074357 B * 9/2019 ............. B64C 27/14
JP 2004-096318 A 3/2004
(Continued)

OTHER PUBLICATIONS

Chretien, Pascal, electromagnetic distributed direct-drive device for an aircraft, Sep. 27, 2019, Clarivate Analytics, pp. 1-88 (Year: 2019).*

Primary Examiner — Antony M Paul
(74) Attorney, Agent, or Firm — Oliff PLC

(57) ABSTRACT

A control device is provided which controls an electric drive system, which has a motor that rotates a rotor blade and an inverter circuit that has a switching element and controls the motor and which is installed in a flying body. The control device includes an abnormality occurrence detection unit that detects occurrence of a predetermined abnormality accompanied with an abnormality of temperature of the switching element, and a switching element control unit that controls, when the occurrence of the predetermined abnormality is detected, the switching element so as to reduce loss in the switching element.

5 Claims, 3 Drawing Sheets

(51) Int. Cl.
*H02K 11/25* (2016.01)
*H02K 11/33* (2016.01)
*H02P 6/08* (2016.01)

(58) Field of Classification Search
CPC ......... B60L 2240/423; B60L 2240/443; B60L 2200/10; B60L 2270/36; B60L 3/003; B60L 58/26; B60L 58/27; B60L 2220/12; B60L 2220/14; B60W 10/08; B60W 10/26; B60W 20/00; B64C 29/0016; B64U 30/20; B64U 2201/10; B64U 50/19
See application file for complete search history.

(56) References Cited

FOREIGN PATENT DOCUMENTS

| | | |
|---|---|---|
| JP | 2010-051040 A | 3/2010 |
| WO | 2020/013264 A1 | 1/2020 |

\* cited by examiner

CONTROL DEVICE FOR ELECTRIC DRIVE SYSTEM

CROSS-REFERENCE TO RELATED APPLICATION

The present application is based on and claims the benefit of priority from earlier Japanese Patent Application No. 2020-023227 filed Feb. 14, 2020, the description of which is incorporated herein by reference.

BACKGROUND

Technical Field

The present disclosure relates to a control device for an electric drive system.

Related Art

Motor control devices have been proposed which suppress increase in temperature thereof when an abnormality has occurred in a cooling function thereof.

SUMMARY

As an aspect of the present disclosure, a control device is provided which controls an electric drive system, which has a motor that rotates a rotor blade and an inverter circuit that has a switching element and controls the motor and which is installed in a flying body. The control device includes: an abnormality occurrence detection unit that detects occurrence of a predetermined abnormality accompanied with an abnormality of temperature of the switching element; and a switching element control unit that controls, when the occurrence of the predetermined abnormality is detected, the switching element so as to reduce loss in the switching element.

DETAILED DESCRIPTION OF THE PREFERRED EMBODIMENTS

Motor control devices have been proposed which suppress increase in temperature thereof when an abnormality has occurred in a cooling function thereof. For example, JP 2010-51040 A discloses a motor control device, which has a cooling function, for driving a vehicle. When an abnormality such as stagnation of a flow of a cooling medium has occurred, the motor control device controls motor output (torque) so as to suppress increase in temperature thereof. When determining that an abnormality of the cooling function has occurred, the motor control device determines a torque command value depending on a correction estimated value obtained by adding a positive offset value to an estimated temperature of the cooling medium. Hence, the motor control device suppresses increase in temperature thereof.

Associated with electrification of movable bodies or the like, electric drive systems (EDS) having a motor and an inverter circuit are used for various applications. For example, the electric drive system is used to rotate a rotor blade of a manned or unmanned electric aircraft, which is called an electric vertical take-off and landing aircraft (eVTOL), a screw propeller of a boat, or wheels of a vehicle or an electric train. In a movable body on the ground such as a vehicle or an electric train, when an abnormality has occurred in a cooling function of a motor control device, the method disclosed in JP 2010-51040 A is applied to suppress increase in temperature thereof on the premise that motor output is limited. However, for example, the electric aircraft may not be able to limit motor output during flight. The motor control device in JP 2010-51040 A does not consider suppressing increase in temperature of the motor control device when motor output cannot be limited. Hence, a technique is desired which can suppress increase in temperature while suppressing reduction of motor output.

A. First Embodiment

Figure 1:
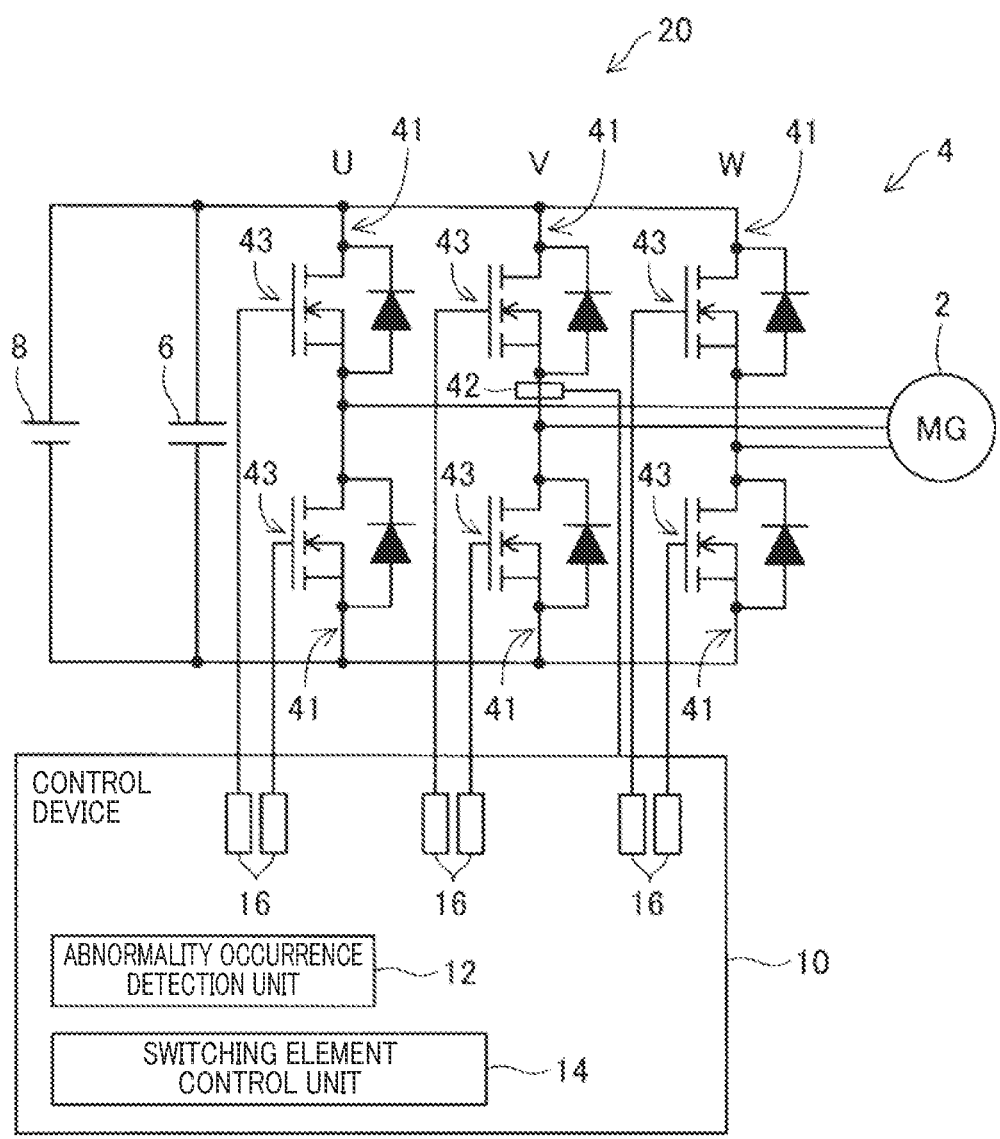
FIG. 1 is a schematic diagram illustrating configurations of a control device according to an embodiment of the present disclosure, a battery, and an electric drive system.

A-1. System configuration:

A control device 10 according to an embodiment of the present disclosure illustrated in FIG. 1 is electrically connected to an electric drive system 20 (hereinafter, also referred to as an EDS) and performs temperature control of the EDS 20. The control device 10 acquires a temperature from a temperature sensor 42 fixed to a switching element 43 included in the EDS 20 to control the switching elements 43 by using the acquired temperature. In the present embodiment, the control device 10, a battery 8, and the EDS 20 illustrated in FIG. 1 are installed in a flying body (aerial vehicle, flight vehicle), for example, an electric vertical take-off and landing aircraft (hereinafter, also referred to as an eVTOL). The eVTOL is configured as a manned aircraft that is electrically driven and is capable of taking-off and landing in the vertical direction.

In the present embodiment, the EDS 20 has a motor 2 and an inverter circuit 4 and is used for, for example, rotating a rotor blade of the eVTOL.

In the present embodiment, the motor 2 is configured by a three-phase AC brushless motor and outputs rotational motion depending on voltage and current supplied from the inverter circuit 4 described later. The motor 2 is not limited to the brushless motor and may be configured by any kind of motor such as an induction motor and a reluctance motor. In the present embodiment, the motor has a broad meaning including not only a so-called electric motor but also an electric motor generator.

The inverter circuit 4 drives the motor 2. The inverter circuit 4 converts DC voltage supplied from the battery 8 to three-phase AC voltage and supplies the three-phase AC voltage to the motor 2. The inverter circuit 4 has three legs respectively provided to U-phase, V-phase, and W-phase. Each of the legs has two switching circuits, that is, upper and lower switching circuits 41. That is, the inverter circuit 4 has six switching circuits 41. The DC voltage supplied from the battery 8 to the inverter circuit 4 is smoothed by a capacitor 6.

The switching circuits 41 includes a plurality of switching elements 43. Each of the switching elements 43 is connected with a freewheel diode. In the present embodiment, the switching element 43 is configured by a MOSFET (Metal-Oxide-Semiconductor Field-Effect Transistor). However, the switching element 43 may be configured by not only a MOSFET but also a power element such as an IGBT (Insulated Gate Bipolar Transistor).

In the present embodiment, the control device 10 is configured by a microcomputer having a CPU, a ROM, and a RAM. The CPU executes a control program stored in the ROM in advance to function as an abnormality occurrence detection unit 12 and a switching element control unit 14. The control device 10 includes resistance adjustment units 16.

The abnormality occurrence detection unit 12 detects occurrence of an abnormality of temperature of the switching element 43. As described later, the abnormality occurrence detection unit 12 acquires temperature of the switching element 43 detected by the temperature sensor 42 fixed to the switching element 43 and uses the temperature to detect occurrence of an abnormality of temperature of the switching element 43. In the present embodiment, the temperature sensor 42 includes a temperature-sensitive diode. As illustrated in FIG. 1, the temperature sensor 42 is fixed to one of the two V-phase switching elements 43.

If determining that the temperature of the switching element 43 is a predetermined threshold value or more, the switching element control unit 14 increases a switching speed of the switching element 43. The switching element control unit 14 adjusts the resistance adjustment unit 16 to increase the switching speed.

In the present embodiment, each of the resistance adjustment units 16 is configured by a variable resistor. The resistance adjustment units 16 are installed in the control device 10. As illustrated in FIG. 1, the resistance adjustment units 16 are respectively connected to gate electrodes of the switching elements 43.

The battery 8 is configured by a lithium-ion battery and is a secondary battery functioning as a power source of the electric drive system 20. The battery 8 mainly supplies electrical power to a drive section of the inverter circuit 4 of the electric drive system 20 to drive the motor 2. Instead of the lithium-ion battery, the battery 8 may configured by an arbitrary secondary battery such as a nickel-metal hydride battery.

Figure 2:
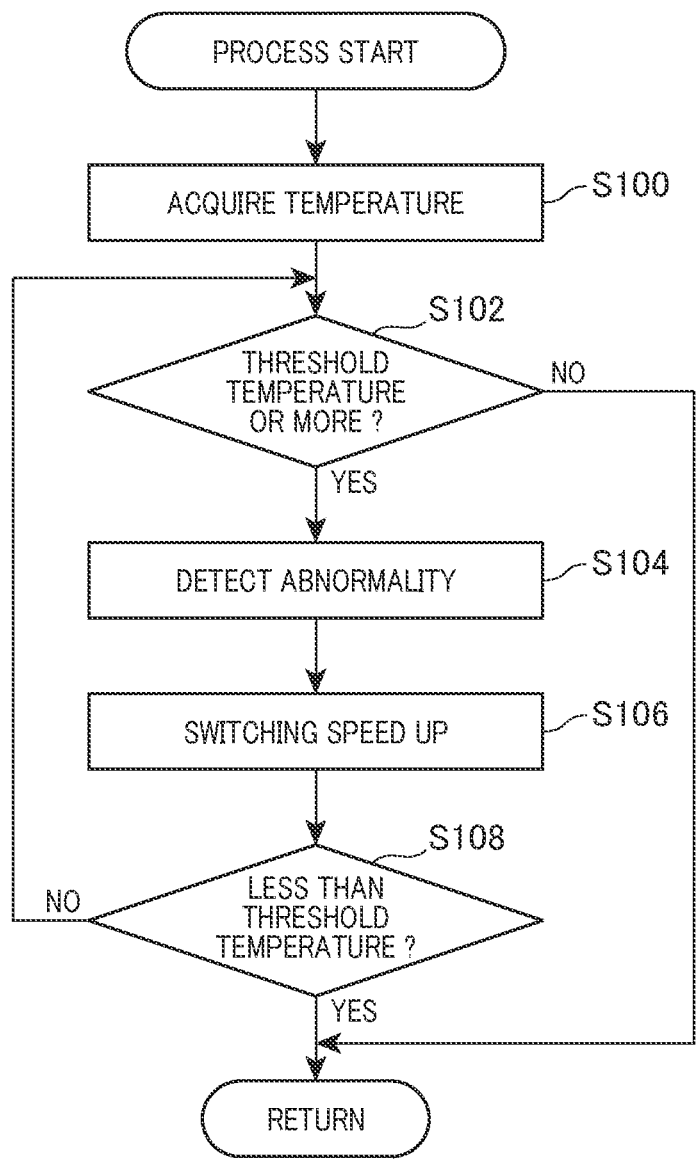
FIG. 2 is a flowchart illustrating a procedure of a temperature control process.

A-2. Temperature Control Process of Switching Element:

The flowchart in FIG. 2 illustrates a process for controlling temperature of the switching elements 43 and is executed when a power supply of the control device 10 is turned on.

The abnormality occurrence detection unit 12 of the control device 10 acquires a temperature of the switching element 43 from the temperature sensor 42 (step S100).

The abnormality occurrence detection unit 12 determines whether the acquired temperature is a predetermined threshold temperature or more (step S102). The threshold temperature is specified and set in advance by an experiment or the like as a temperature by which an abnormality, for example, requiring an eVTOL to make an emergency landing can be detected. If the temperature of the switching element 43 exceeds the threshold temperature, for example, it can be assumed that a pump has failed which circulates a cooling medium through a cooling medium flow channel, not shown for cooling the switching circuits 41, or it can be assumed that the temperature sensor 42 has failed.

If the abnormality occurrence detection unit 12 determines that the acquired temperature is not the predetermined threshold temperature or more (step S102: No), the process returns to the step S100 described above. In contrast, if determining that the acquired temperature is the predetermined threshold temperature or more (step S102: Yes), the abnormality occurrence detection unit 12 specifies that an abnormality is detected (step S104). For example, the abnormality occurrence detection unit 12 sets a flag indicating that an abnormality has been detected.

The switching element control unit 14 increases the switching speed (step S106). Specifically, the switching element control unit 14 controls the resistance adjustment units 16 to decrease the resistance value. The decrease in the resistance value increases the amount of current flowing to the gate electrode of the switching element 43. Hence, the switching speed of the switching element 43 increases.

The increase in the switching speed of the switching element 43 decreases output current between the emitter and the collector. As a result, increase of loss (amount of heat generation) in the switching element 43 can be suppressed.

The abnormality occurrence detection unit 12 determines whether the temperature of the switching element 43 is less than the predetermined threshold temperature (step S108). If the abnormality occurrence detection unit 12 determines that the temperature of the switching element 43 is not less than the predetermined threshold temperature (step S108: No), the process returns to the step S102 described above. If the abnormality occurrence detection unit 12 determines that the temperature of the switching element 43 is less than the predetermined threshold temperature (step S108: Yes), the process returns to the step S100 described above.

Figure 3:
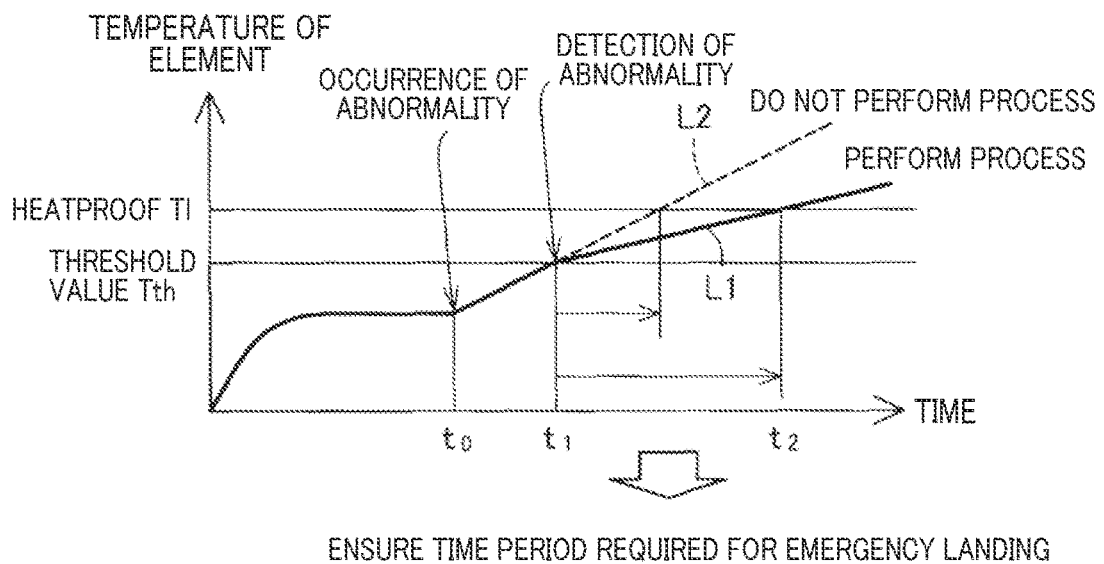
FIG. 3 is an explanatory drawing illustrating an example of a temperature change of a switching element.

In FIG. 3, the horizontal axis indicates time, and the vertical axis indicates temperature of the switching element 43. Heatproof temperature TI indicates heatproof temperature of the switching element 43. In FIG. 3, a temperature change L1 of the switching element 43 in a case in which the temperature control process described above is performed is shown by a thick solid line. A temperature change L2 of the switching element 43 in a case in which the temperature control process described above is not performed is shown by a broken line. A predetermined abnormality, for example, an abnormality of temperature of the switching element 43 requiring an eVTOL to make an emergency landing occurs at time $t_0$. The time at which temperature of the switching element 43 has reached a threshold value Tth is shown by time $t_1$ as time at which the occurrence of the abnormality has been detected. That is, time $t_1$ corresponds to a time point at which step S104 in FIG. 2 is performed.

In the example illustrated in FIG. 3, a time period from time $t^1$ to time $t_2$ is required for an emergency landing. Until time $t^1$ at which occurrence of an abnormality of temperature of the switching element 43 requiring an emergency landing is detected, the temperature change L1 and the temperature change L2 are equal to each other. In contrast, after time $t^1$ at which occurrence of an abnormality of temperature of the switching element 43 requiring an emergency landing is detected, the temperature change L1 and the temperature change L2 are different from each other. Specifically, the control device 10 of the present embodiment increases a switching speed of the switching element 43 to decrease a rate of temperature rise of the switching element 43. Hence, the temperature change L1 does not exceed the heatproof temperature TI of the switching element 43, whereby the time period required for an emergency landing can be ensured.

On the other hand, the rate of temperature rise of the temperature change L2 of a comparative example is higher than that of the temperature change L1 of the control device 10 of the present embodiment. In the comparative example, the time period required for an emergency landing cannot be ensured, whereby the temperature of the switching element 43 exceeds the heatproof temperature TI before the landing.

According to the control device 10 of the first embodiment described above, since the control device 10 includes the abnormality occurrence detection unit 12 that detects occurrence of an abnormality of temperature of the switching element 43 and the switching element control unit 14 that controls the switching element 43 so as to reduce loss in the switching element 43 when the occurrence of an abnormality of temperature is detected, the loss in the switching element 43 is reduced when the occurrence of an abnormality of temperature is detected, which can reduce the amount of heat generation of the switching element 43. Hence, increase in temperature can be suppressed while suppressing reduction of motor output.

According to the control device 10 of the first embodiment, the switching element control unit 14 increases a switching speed of the switching element 43, which can reduce the amount of heat generation of the switching element 43. Hence, a device having a configuration for implementing temperature control of the switching element 43 can be provided easily.

B. Second Embodiment

Figure 4:
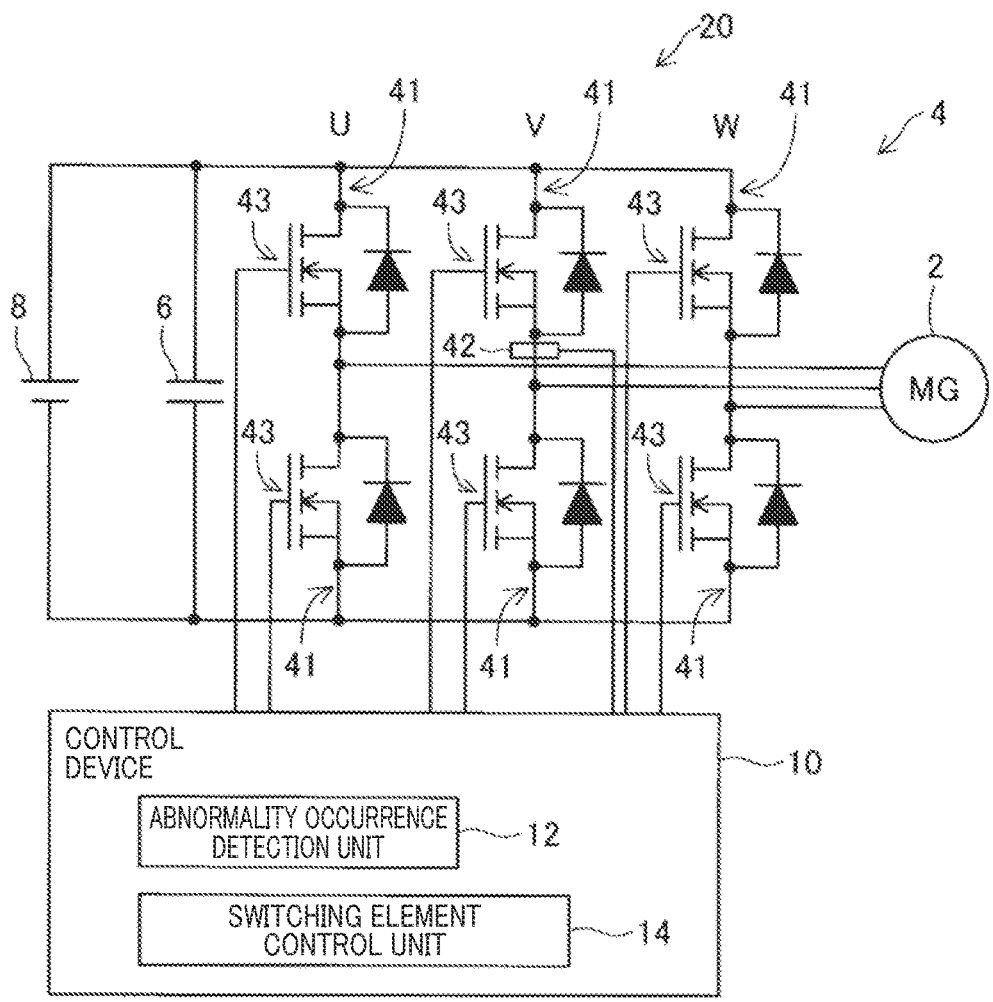
FIG. 4 is a schematic diagram illustrating configurations of a control device according to a second embodiment, a battery, and an electric drive system.

As illustrated in FIG. 4, the configuration of the control device 10 of the second embodiment differs from that of the control device 10 of the first embodiment in that the control device 10 of the second embodiment does not include the resistance adjustment units 16.

Since other configurations of the control device 10 of the second embodiment are the same as those of the control device 10 of the first embodiment, the same elements are denoted by the same reference signs to omit redundant descriptions.

In the first embodiment, the switching element control unit 14 increases the switching speed of the switching element 43 to reduce the amount of heat generation of the switching element 43. However, in the second embodiment, the switching element control unit 14 lowers a carrier frequency used for PWM control to reduce the amount of heat generation of the switching element 43.

A process for controlling the temperature of the switching element 43 in the second embodiment differs from the process for controlling the temperature of the switching element 43 in the first embodiment in that processing in step S106 in FIG. 2 lowers a carrier frequency. Since other temperature control processing is the same as that of the control device 10 of the first embodiment, the same steps are denoted by the same reference signs to omit redundant descriptions.

In the control device of the second embodiment, lowering of the carrier frequency by the PWM control described above decreases a frequency of switching of the switching element 43 between on and off. As a result, loss in the switching element 43 decreases, whereby the amount of heat generation of the switching element 43 can be reduced.

According to the control device 10 of the second embodiment described above, effects similar to those of the control device 10 of the first embodiment are provided. In addition, the switching element control unit 14 controls the switching element 43 by PWM control to lower a carrier frequency, thereby reducing the amount of heat generation of the switching element 43. Hence, a device having a configuration for implementing temperature control of the switching element 43 can be provided further easily.

C. Other Embodiments (C1) In the control device 10 of the first embodiment, the abnormality occurrence detection unit 12 detects occurrence of an abnormality of temperature of the switching element 43. However, the control device of the present embodiment is not limited to this. The abnormality occurrence detection unit 12 of the control device 10 of the present embodiment may detect occurrence of a predetermined abnormality accompanied with an abnormality of temperature of the switching element 43. For example, the abnormality occurrence detection unit 12 may detect a failure of a pump circulating a cooling medium or occurrence of an abnormality of the temperature sensor 42. When such a predetermined abnormality is detected, loss in the switching element 43 is reduced as in the first and second embodiments, whereby effects similar to those of the first and second embodiments can be provided.

(C2) In the control device 10 of the first embodiment, the abnormality occurrence detection unit 12 acquires a temperature of the switching element 43 from one temperature sensor 42 fixed to one switching element 43. However, the control device 10 of the first embodiment is not limited to this. The abnormality occurrence detection unit 12 of the control device 10 of the present embodiment may acquire temperatures of the switching elements 43 from six temperature sensors 42 fixed to the respective switching elements 43. If the temperature acquired from any of the six temperature sensors 42 is the threshold temperature or more, the switching element control unit 14 may control the switching elements 43 so as to reduce loss in the switching elements 43. If an averaged value of the temperatures acquired from the six temperature sensors 42 is the threshold temperature or more, the switching element control unit 14 may control the switching elements 43 so as to reduce loss in the switching elements 43. The abnormality occurrence detection unit 12 of the control device 10 of each of the embodiments may compare the six temperature sensors 42 prepared for the respective switching elements 43 with each other to detect an abnormality of temperature. If temperatures of the respective temperature sensors 42 are greatly different from each other, the abnormality occurrence detection unit 12 may detect occurrence of an abnormality of the temperature sensor 42 accompanied with an abnormality of temperature of the switching element 43.

(C3) In the control device 10 of the first embodiment, the resistance adjustment unit 16 is configured by a variable resistor. However, the control device 10 of the present embodiment is not limited to this. For example, the resistance adjustment unit 16 may include two resistors that have resistance values different form each other and that are connected in parallel and a relay switch for switching. Hence, the switching element control unit 14 switches over to the resistor having the smaller resistance value, which can increase the switching speed. Alternatively, for example, the resistance adjustment unit 16 may include two resistors that have the same resistance value and that are connected in parallel, a relay switch for switching, and a speed-up capacitor that is connected to one of the resistors in parallel. Hence, the switching element control unit 14 can switch over to the resistor 80 connected to the speed-up capacitor in parallel to increase the switching speed.

(C4) In the control device 10 of each of the embodiments, when occurrence of an abnormality of temperature of the switching element 43 is detected, the switching element control unit 14 controls the switching element 43 so as to reduce loss in the switching element 43. However, the control device 10 of the present embodiment is not limited to this. In addition to this, when an abnormality requiring a landing has occurred, the switching element control unit 14 of the control device 10 of the present embodiment may control the switching element 43 so that the motor 2 outputs power required for the landing from the detection of the abnormality until the landing. When such an abnormality requiring a landing has occurred, the power required for the landing can be continuously output.

The present disclosure is not limited to the above embodiments and can be implemented by various configurations within a range not deviating from the spirit thereof. For example, technical features in the embodiments corresponding to the technical features in the aspect described in SUMMARY can be appropriately replaced or combined with each other in order to solve all or part of the objects described above or to achieve all or part of the effects described above. Some of the technical features can be appropriately deleted if they are not described as essential herein.

The present disclosure can be implemented as the following aspect.

As an aspect of the present disclosure, a control device (10) is provided which controls an electric drive system (20), which has a motor (2) that rotates a rotor blade and an inverter circuit (4) that has a switching element (43) and controls the motor and which is installed in a flying body. The control device includes: an abnormality occurrence detection unit (12) that detects occurrence of a predetermined abnormality that is at least one of an abnormality of temperature of the switching element and an abnormality accompanied with the abnormality of temperature; and a switching element control unit (14) that controls, when the predetermined abnormality is detected, the switching element so as to reduce loss in the switching element.

According to the control device of the aspect, since the control device includes an abnormality occurrence detection unit that detects 11*l* occurrence of a predetermined abnormality that is at least one of an abnormality of temperature of the switching element and an abnormality accompanied with the abnormality of temperature, and a switching element control unit that controls, when the predetermined abnormality is detected, the switching element so as to reduce loss in the switching element, the loss in the switching element is reduced when the occurrence of the predetermined abnormality is detected, which can reduce the amount of heat generation of the switching element. Hence, increase in temperature can be suppressed while suppressing reduction of motor output.

What is claimed is:

1. A control device that controls an electric drive system, which has a motor that rotates a rotor blade and an inverter circuit that has a switching element and controls the motor and which is installed in a flying body, the control device comprising:
   an abnormality occurrence detection unit that detects occurrence of a predetermined abnormality accompanied with an abnormality of temperature of the switching element; and
   a switching element control unit that controls, when the occurrence of the predetermined abnormality is detected, the switching element so as to reduce loss in the switching element.

2. The control device according to claim 1, wherein the switching element control unit reduces the loss by increasing switching speed of the switching element.

3. The control device according to claim 1, wherein the switching element control unit controls the switching element by PWM control to lower a carrier frequency used for the PWM control to reduce the loss.

4. The control device according to claim 1, wherein the switching element control unit controls, when the predetermined abnormality requires a landing, the switching element so that the motor outputs power required for the landing until the landing.

5. The control device according to claim 1, wherein the flying body has a cooling medium flow channel for cooling the switching circuit, a pump provided to the cooling medium flow channel to circulate a cooling medium, and a temperature sensor detecting a temperature of the switching element, and
   the predetermined abnormality includes at least one of a failure of the pump and an abnormality of the temperature sensor.

* * * * *